United States Patent [19]

Savall et al.

[11] Patent Number: 4,835,822
[45] Date of Patent: Jun. 6, 1989

[54] FRUSTOCONIC ANCHORING JAWS FOR CABLES AND THEIR METHODS OF MANUFACTURE

[75] Inventors: Jose Savall, Chartres; Claude Parmentier; Bernard Amelot, both of Epernon, all of France

[73] Assignee: Freyssinet International (Stup), Coignieres, France

[21] Appl. No.: 84,083

[22] Filed: Aug. 11, 1987

Related U.S. Application Data

[63] Continuation of Ser. No. 893,282, Aug. 5, 1986, Pat. No. 4,707,890.

[30] Foreign Application Priority Data

Aug. 12, 1985 [FR] France .................. 85 12290

[51] Int. Cl.⁴ .......................................... F16G 11/00
[52] U.S. Cl. ............................ 24/122.6; 24/115 R; 403/371; 411/42
[58] Field of Search ............... 24/122.6, 122.3, 115 R, 24/115 M, 136 R, 136 L; 411/39, 42; 29/413, 418, 416; 403/371, 374, 314

[56] References Cited

U.S. PATENT DOCUMENTS

| | | | |
|---|---|---|---|
| 1,099,668 | 6/1914 | Rosenberg | 411/42 |
| 2,078,051 | 4/1937 | Berndt | 403/371 |
| 2,144,050 | 1/1939 | Fotsch | 403/371 |
| 2,166,458 | 7/1939 | Berndt et al. | 403/371 |
| 2,177,364 | 10/1939 | Fotsch | 403/371 |
| 3,082,657 | 3/1963 | Fischer | 411/42 |
| 3,448,651 | 6/1969 | Passer | 411/42 |
| 3,605,361 | 9/1971 | Howlett et al. | 24/122.6 |
| 3,673,644 | 7/1972 | Howlett et al. | 24/122.6 |
| 3,820,832 | 6/1974 | Brandestini et al. | 24/122.6 |
| 3,879,147 | 4/1975 | Morell | 24/115 M |
| 3,975,799 | 8/1976 | Kerr | 24/122.6 |
| 4,114,242 | 9/1978 | Luthi | 24/115 R |
| 4,333,675 | 6/1982 | Wirkkala | 24/122.6 |

FOREIGN PATENT DOCUMENTS

| | | | |
|---|---|---|---|
| 468873 | 10/1950 | Canada | 411/42 |
| 498826 | 1/1939 | United Kingdom | 411/42 |

Primary Examiner—Victor N. Sakran
Attorney, Agent, or Firm—Fleit, Jacobson, Cohn & Price

[57] ABSTRACT

To prepare a split frustoconic jaw intended for the anchoring of a cable, a part is first taken bounded externally by a frustoconic surface and hollowed by a cylindrical axial channel whose inner surface is advantageously striated. This part is sawed into by substantially axial and radial slashes leaving bridges to subsist of small thickness at the bottom of these slashes throughout the central channel. An assembly ring is mounted in an outer annular groove and the whole is subjected to cementation treatment so as to surface harden the jaw while making the bridges fragile.

3 Claims, 1 Drawing Sheet

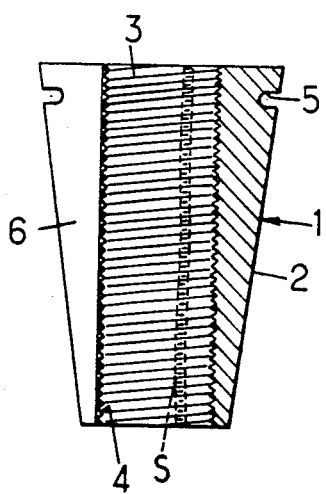
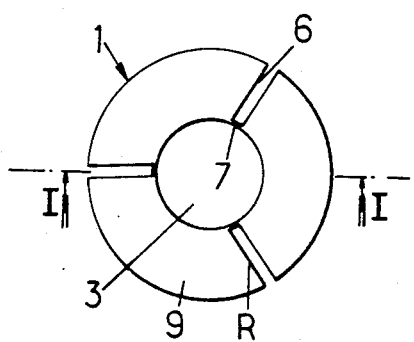
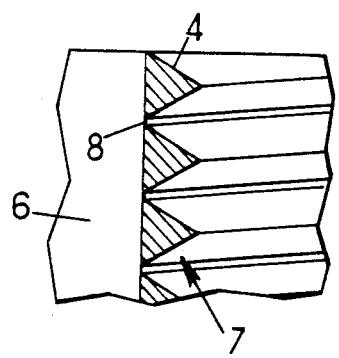
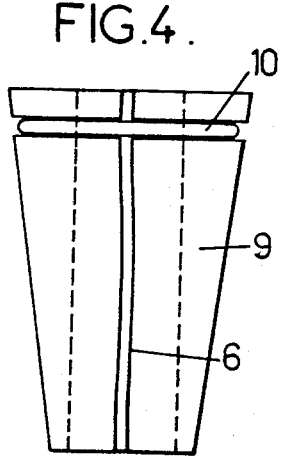
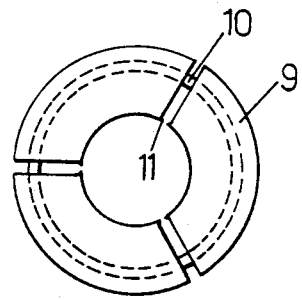

FRUSTOCONIC ANCHORING JAWS FOR CABLES AND THEIR METHODS OF MANUFACTURE

This is a continuation of application Ser. No. 893,282 filed Aug. 5, 1986 now U.S. Pat. No. 4,707,890.

BACKGROUND OF THE INVENTION

The invention relates to split frustoconic jaws designed for anchoring to retainer blocks cables such as those intended to produce pre-stressing in a concrete structure or to brace a bridge, these jaws being adapted to grip these cables and to coact with housings having at least one complementary frustoconic portion, said housings being hollowed from one side to the other in said blocks.

The jaws concerned are composed of two, three or four indentical elements—called "keys" below—each derived from an original part bounded externally by a frustoconic surface and hollowed by a cylindrical axial channel whose inner surface is advantageously scored, said original part being decomposed into said keys by sawing along two, three or four radial half-planes.

In known embodiments of the above jaws, the keys obtained by sawing are gathered in bulk.

Then they are subjected to a surface hardening heat treatment, and, to form a jaw, there are taken from the keys thus treated the required number—generally three—of the latter and they are assembled by means of an annular steel ring housed in a circular groove itself hollowed in the outer frustoconic surface of the original part, in the vicinity of its large base.

This assembly formula presents certain drawbacks and in particular the following.

By reason of the mixing in bulk of the keys between their fabrication by sawing and individual taking-up following the hardening treatment, the keys taken up to constitute each jaw do not generally come from the same original part.

This circumstance would be of no consequence if all the keys were strictly identical.

However this is not the case in industrial manufacture on a production scale since then the saw lines are not always strictly axial and radial and their mutual angular separations are not always strictly equal between them.

Thus the cutting out of the original part can present the sinuous shape visible at S in FIG. 1 or extend along planes inclined to the ideal radial planes, as visible at R in FIG. 2.

In this case, the gripping of the jaws concerned does not lead to perfect juxtaposition plane to plane of the lateral surfaces of contiguous keys: the juxtaposition of these keys reconstitutes a very imperfect cylindrical channel, with the formation of excessive and irregular spaces between the keys and possibly the creation of gaps at the level of their connections, which can generate high local stresses capable of causing the breaking or the slipping of the cables to be anchored.

To overcome this drawback, severe checks and manufacturing tolerances must be imposed, hence expensive for the manufacturer of the keys.

It is an essential object of the invention to overcome the drawback indicated in a particularly economical manner since it permits the checks indicated to be eliminated.

GENERAL DISCRIPION OF THE INVENTION

Accordingly the anchoring jaws according to the invention are essentially characterized in that the totality of the keys which compose each of them come from the same original part, the sawing intended to decompose this part into keys being left intentionally incomplete so as to allow connecting bridges of small thickness to subsist between contiguous keys along the central channel of said part.

The method of manufacture of said jaws is for its part essentially characterized by the following sequence of operations: sawing of the original part along substantially axial and radial severage lines performed so as to allow bridges of small thickness to subsist at the bottom of these severage lines along the central channel, said bridges holding the keys joined to one another and treatment of the part thus slashed adapted to surface harden the keys whilst rendering the bridges fragile.

In preferred embodiments, recourse is had in addition to one and/other of the following features:

an assembly ring of steel is mounted in the annular groove of the part after its sawing and before the hardening treatment, the bridges have a radial thickness less than or equal to 1 mm, the inner cylindrical surface of the channel is serrated and the bridges are discontinuous, being hollowed out radially at the level of the hollows of the serrations.

The invention comprises, apart from these main features, certain other features which are preferably used at the same time and which will be more explicitly considered below.

In the following, a preferred embodiment of the invention will described with reference to the accompanying drawing given of course as non-limiting.

BRIEF DESCRIPTION OF THE DRAWINGS

FIGS. 1 and 2 of this drawing, show respectively in axial section along the line I—I FIG. 2, and in end view the blank of a jaw according to the invention such as it appears after sawing the original part and before positioning of the ring.

FIG. 3 shows on a larger scale a portion of FIG. 1.

FIGS. 4 and 5 show respectively in side view and in end view the jaw obtained according to the invention from the above blank.

DESCRIPTION OF PREFERRED EMBODIMENTS

To produce such a jaw, a start is made in manner known in itself with a part 1—called "original part" in the present description—bounded externally by a frustoconic surface 2 and hollowed axially by a cylindrical channel 3.

The inner surface of this channel is scored at 4 along particularly a helicoidal thread with a triangular cross-section.

An annular groove 5 is in addition hollowed in the frustoconic surface 2 in the vicinity of its large base.

The part 1 concerned is advantageously constituted of soft steel easily machinable but which can be surface hardened by heat treatment such as cementation.

It is in this part 1 that the narrow slashes 6 are formed by sawing lying along planes passing through the axis X of said part.

In the preferred embodiment illustrated, these cuts 6 are three in number and spaced angularly from one another by 120° around the axis X.

The slashes 6 are not integrally hollowed in the part 1: each of them is interrupted so as to allow to subsist along the central channel 3 a bridge 7 throughout this channel.

The radial thickness e of each bridge 7 is very small, being preferably less than 1 mm, for example of the order of 0.3 to 0.7 mm, when the elements to be anchored by the jaws concerned are strands having a diameter of the order of 15 mm.

The depth of the striae 4 can be greater than said thickness e: the bridges 7 are then interrupted at the level of the hollows of the striae 4 by holes 8 (FIG. 3) showing in the form of dots.

It is to be noted that in spite of the smallness of the thickness e, it is relatively easy to adjust the sawing in consequence considering that the production of the three slashes 6 can be done simultaneously by means of three milling cutters whose respective dimensions and positions are strictly determined and between which the part 1 is forced axially.

The jaw blank thus slashed remains constituted by a single block or "monolith" and may be mixed in bulk with other similar blanks.

The stresses exerted on the bridges 7 at this stage are in fact very much less than those which would be necessary to break said bridges, which have not yet been made fragile by cementation and have then essentially the purpose of preserving a bond between the keys to be formed 9.

Then one by one the one piece blanks which are not yet divided into separate keys are taken up so as to position an assembly ring 10 in each groove 5 said ring being generally constituted from spring steel.

The assembly is then subjected to the cementation treatment which results in the surface hardening of the keys 9 and of the bridges 7.

This treatment is particularly heating at a temperature comprised between 900° and 1000° C. performed in three-quarters of an hour in a carburising atmosphere, said heating being followed by quenching.

The steel so treated has then become superficially very hard and the bridges have become relatively fragile and breakable.

The simple taking up in the hands of the assembly at this stage suffices to break said bridges 7, which then become broken into small fragments.

This breakage which only permits the roots 11 of said bridges to subsist, which roots are comparable to untrimmed burrs, releases the constituent keys 9 of the jaws with respect to one another.

However this release no longer risks completely separating these keys in view of the presence of the ring 10.

It is to be noted that the presence of the residual burrs 11 is advantageous considering that at the beginning of the gripping of the jaw these burrs maintain the keys mutually separated from one another, which prevents their dissymmetric angular assembly being manifested by the creation of too wide a slit.

On the subsequent clamping, these burrs are not troublesome considering that they are then crushed and broken forming small chips.

The keys 9 constituting the jaws thus manufactured have the important advantage of coming from the same original part so that they are juxtaposed laterally in intimate contact between complementary contiguous surfaces, the juxtaposed surfaces having exactly the same irregularities (sinuosities, defects of orientation, of angular position, ...) and that their juxtaposition reconstitutes exactly the desired cylindrical channel.

This result is obtained even for relatively large irregularities observed on the traces, orientations and positions of the saw lines, which enables the reduction to a considerable extent of the importance and the cost of checks relating to the sawing operations.

As a result of which, and whatever the embodiment adopted, there is finally provided an anchoring jaw whose constitution, manufacture and advantages emerge sufficiently from the foregoing.

As is self-evident, and as emerges besides already from the foregoing, the invention is in no way limited to those of its types of application and embodiments which have been more especially envisaged: it encompasses, on the contrary, all modifications, particularly those where the number of bridges 7 subsisting between the keys 9 at the end of the sawing operations would be less by one unit than the number of cuts 6 effected in the course of the sawing operations, and those where, the bridges being sufficiently thick to ensure provisionally the mutual joining of the keys even after their hardening, the assembly ring would be mounted on the frustoconic part after the hardening treatment and not before the latter.

We claim:

1. A split frustoconic jaw intended for anchoring a cable comprising:

keys composing said jaw, each key including lateral faces having a wide, smooth, external part obtained by sawing, burrs obtained by breakage at a narrow internal part of each key, wherein the totality of said keys which compose said jaw come from the same original part bounded externally by a frustoconic surface and hollowed by a cylindrical axial channel whose inner surface is advantageously striated and made of a surface hardened metal, sawings intended to decompose said original part into said keys having remained intentionally incomplete so as to leave initially subsisting connection bridges of small thickness between said keys along the cylindrical axial channel, said bridges being subsequently broken to form said burrs.

2. A split frustoconic jaw according to claim 1, wherein the bridges have a radial thickness less than or equal to 1 mm.

3. A split frustoconic jaw according to claim 1, for which the inner cylindrical surface of the channel is striated, wherein the bridges are discontinuous, being hollowed radially at the level of the hollows of the striae.

* * * * *